(12) United States Patent
Lin et al.

(10) Patent No.: US 10,827,029 B2
(45) Date of Patent: Nov. 3, 2020

(54) EVENT MANAGEMENT AND PRESENTATION

(71) Applicant: Shanghai Bilibili Technology Co., Ltd., Shanghai (CN)

(72) Inventors: Xiaoshan Lin, Shanghai (CN); Fang Fang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 132 days.

(21) Appl. No.: 16/194,257

(22) Filed: Nov. 16, 2018

(65) Prior Publication Data

US 2019/0158624 A1     May 23, 2019

(30) Foreign Application Priority Data

Nov. 17, 2017    (CN) .......................... 2017 1 1145627

(51) Int. Cl.
*H04L 29/08*        (2006.01)
*G06Q 50/00*      (2012.01)

(52) U.S. Cl.
CPC ........... *H04L 67/306* (2013.01); *G06Q 50/01* (2013.01); *H04L 67/22* (2013.01)

(58) Field of Classification Search
CPC ....... H04L 67/306; H04L 67/22; H04L 50/00; G06Q 50/01
See application file for complete search history.

(56) References Cited

U.S. PATENT DOCUMENTS

| | | | |
|---|---|---|---|
| 7,996,374 B1* | 8/2011 | Jones ..................... | G06Q 10/10 707/694 |
| 9,177,065 B1* | 11/2015 | Ben-Yair ................ | G06Q 50/01 |
| 2012/0158852 A1* | 6/2012 | Goldsmith ............. | G06Q 10/10 709/205 |
| 2014/0156748 A1* | 6/2014 | Allen ..................... | G06Q 50/01 709/204 |
| 2016/0328868 A1* | 11/2016 | Tran ....................... | G06Q 50/01 |
| 2016/0366466 A1* | 12/2016 | Shen ..................... | H04N 21/431 |

(Continued)

FOREIGN PATENT DOCUMENTS

| | | |
|---|---|---|
| CN | 105163179 A | 12/2015 |
| CN | 105847717 A | 8/2016 |
| CN | 105847852 A | 8/2016 |

(Continued)

*Primary Examiner* — Backhean Tiv
*Assistant Examiner* — Jihad K Boustany
(74) *Attorney, Agent, or Firm* — BakerHostetler

(57) ABSTRACT

Techniques for managing and presenting violation events in a network community are described herein. The disclosed techniques include receiving a file containing information indicative of a violation by a user account in the network community who violates community guidelines and storing the file into a violation display pool in response to a determination that a corresponding violation score is greater than a predetermined threshold. The violation display pool comprises a plurality of violation events that each comprise information indicative of a source of a corresponding violation event, at least one attribute of content associated with the corresponding violation event, and information relating to content of the corresponding violation event. A storage server sends the plurality of violation events to a plurality of client computing devices for display via an interface.

20 Claims, 8 Drawing Sheets

(56) References Cited

U.S. PATENT DOCUMENTS

2018/0349487 A1* 12/2018 Garg .................. G06F 16/289

FOREIGN PATENT DOCUMENTS

| CN | 105933781 A | 9/2016 |
| CN | 105959715 A | 9/2016 |
| CN | 105992021 A | 10/2016 |
| CN | 106028072 A | 10/2016 |
| CN | 106028151 A | 10/2016 |

* cited by examiner

EVENT MANAGEMENT AND PRESENTATION

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
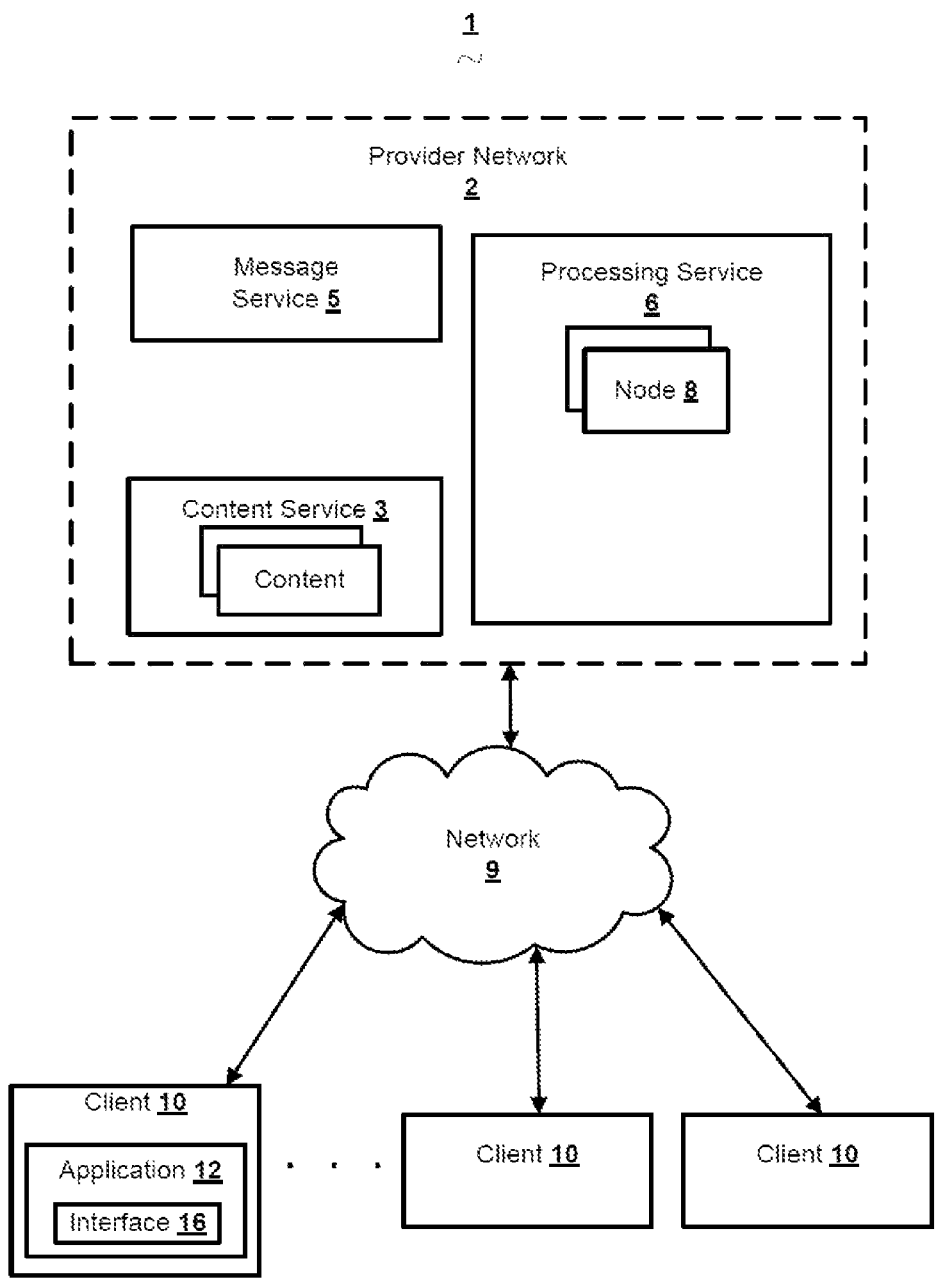
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screen."

The provider network 2 may be located at a data center, such as a single premises, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof; the plurality of processing nodes 8 may also process, manage, and store data indicative of violation events by user accounts who violate a set of community guidelines. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, violation events, user accounts, and/or the like.

The interface 16 may also be configured to present violation events in an array of cards in a dynamic area that may comprise a plurality of interface elements for selecting to display different classifications of violation events. In an example, the interface 16 may display detailed information associated with a particular violation event, including comments on the particular violation event, in response to a selection of a card corresponding to the particular violation event. In another example, the interface 16 may further comprise a second area for displaying user information and community notifications. The second area of the interface 16 may further comprise a plurality of interface elements by which a user selects to display community guidelines or submit a request for a review qualification.

In some embodiments, the interface 16 may be implemented as part of the application 12. The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2. The application 12 may also send events to a processing service. As an example, the application 12 may send an event comprising reasons of submitting the event, content attributes associated with the event, account information of the user account, and/or the like. The techniques for processing events in accordance with the present disclosure can be implemented by the example system as shown in FIG. 1.

Figure 2:
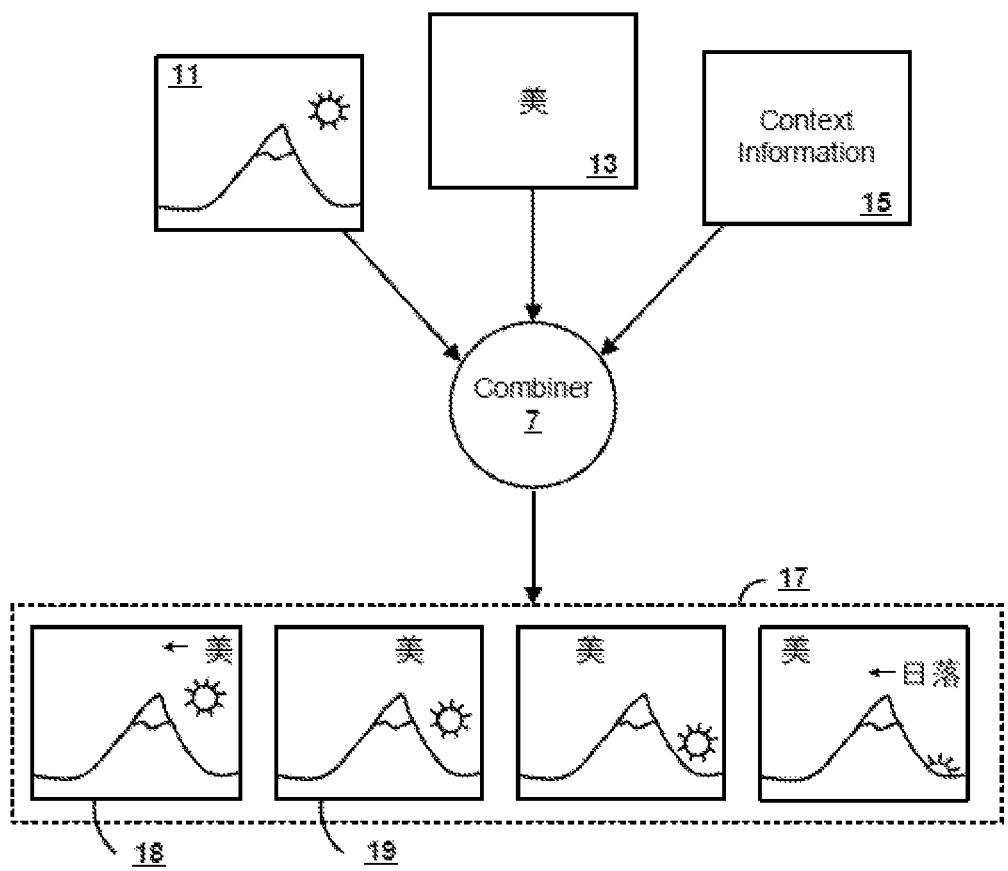
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame maybe ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "日落" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
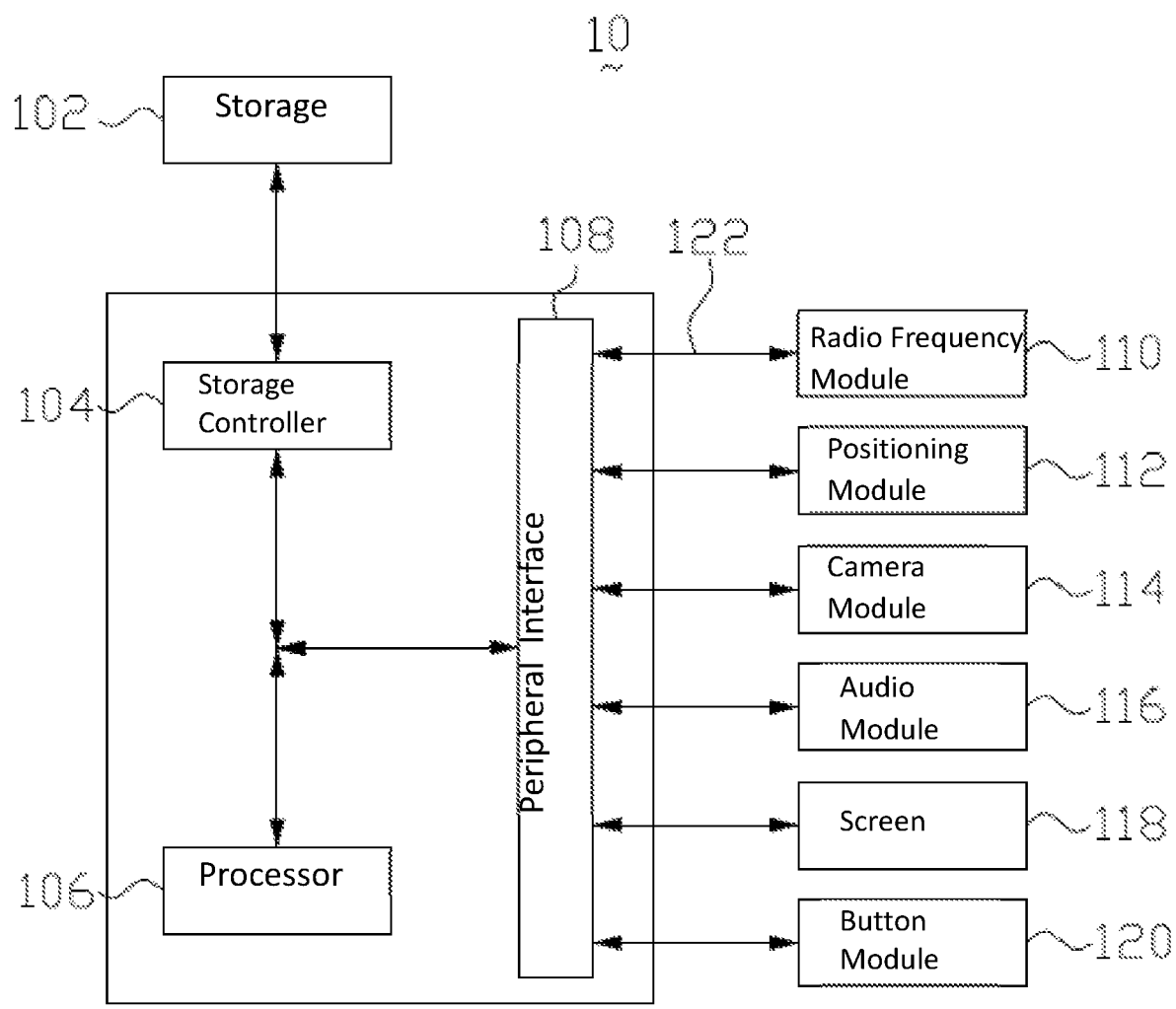
FIG. 3 is a schematic diagram illustrating an example computing device that may be used in accordance with the present disclosure.

FIG. 3 shows a structure block diagram of an example client computing device. As shown in FIG. 3, the client computing device 10 includes a storage 102, a storage controller 104, one or more (only one is shown in the figure) processors 106, a peripheral interface 108, a radio frequency module 110, a positioning module 112, a camera module 114, an audio module 116, a screen 118, and a button module 120. These components communicate with each other through one or more communication buses/signal lines 122.

It can be understood that the structure shown in FIG. 3 is illustrative only, and the terminal 10 may also include more or fewer components than those shown in FIG. 3, or may have a configuration different from that shown in FIG. 3. The components shown in FIG. 3 can be implemented by hardware, software or their combinations.

The storage 102 can be used to store software programs and modules, such as program instructions/modules corresponding to the case allocation methods, the case allocation systems, the event allocation methods and the event allocation systems in the embodiments of the present invention, the processor 106 runs the software programs and modules stored in the storage controller 102, so as to perform various functional applications and data processing, that is, to realize the case allocation methods, the case allocation systems, the event allocation methods and the event allocation systems mentioned above.

The storage 102 may include high-speed random access storages and may also include non-volatile storages, such as one or more magnetic storage devices, flash storages, or other non-volatile solid-state storages. In some embodiments, the storage 102 may further include storages set remotely relative to the processor 106, these remote storages can be connected to the terminal 10 though networks. Examples of the above-mentioned networks include, but are not limited to, the Internet, enterprise intranets, local area networks, mobile communication networks and their combinations. The processor 106 and other possible components visiting the storage 102 may be performed under the control of the storage controller 104.

The peripheral interface 108 couples various input/output devices to the CPU and the storage 102. The processor 106 runs various software and instructions in the storage 102 to perform various functions of the terminal 10 and data processing.

In some embodiments, the peripheral interface 108, the processor 106, and the storage controller 104 may be implemented in a single chip. In some other embodiments, they can be implemented by independent chips, respectively.

The radio frequency module 110 is used to receive and send electromagnetic waves, to realize the conversion between electromagnetic waves and electrical signals, so as to communicate with communication networks or other devices. The radio frequency module 110 may include various existing circuit elements for performing these functions, such as antennas, radio frequency transceivers, digital signal processors, encryption/decryption chips, user identity module (SIM) cards, storages, and so on. The radio frequency module 110 can communicate with various networks such as the Internet, enterprise intranets, wireless networks or communicate with other devices through wireless networks. The above-mentioned wireless networks can include cellular telephone networks, wireless local area networks or metropolitan area networks. These above-mentioned wireless networks can use a variety of communication standards, protocols and technologies, including, but are not limited to, Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (e.g. IEEE (Institute of Electrical and Electronics Engineers) standards IEEE 802.11a, IEEE 802.11b, IEEE 802.11g, and/or IEEE 802.11n), Voice over Internet Protocol (VoIP), Worldwide Interoperability for Microwave Access (Wi-Max), other protocols for mails, instant messages and short messages, and any other suitable communication protocols, and may even include those that are not developed currently.

The positioning module 112 is used to obtain the current position of the terminal 10. Examples of the positioning module 112 include, but are not limited to, Global Positioning Systems (GPS), positioning technologies based on wireless local area networks or mobile communication networks.

The camera module 114 is used to take pictures or videos. The pictures or videos took can be stored in the storage 102 and can be sent through the radio frequency module 110.

The audio module 116 provides audio interfaces to users, which may include one or more microphones, one or more loudspeakers, and an audio circuit. The audio circuit receives sound data from the peripheral interface 108, converts the sound data into electrical information, and transmits the electrical information to the loudspeaker. The loudspeaker converts the electrical information into sound waves that can be heard by human ears. The audio circuit also receives electrical information from the microphone, converts the electrical signal into sound data, and transmits the sound data to the peripheral interface 108 for further processing. Audio data can be obtained from the storage 102 or through the radio frequency module 110. In addition, audio data can also be stored in the storage 102 or transmitted through the radio frequency module 110. In some examples, the audio module 116 may also include a headphone jack for providing an audio interface to a headphone or other devices.

The screen 118 provides an output interface between the terminal 10 and users. Specifically, the screen 118 displays video outputs to the users, the contents of which may include texts, graphics, videos, and any combination thereof. Some output results correspond to some user interface objects. It can be understood that the screen 118 can also include a touch screen. The touch screen provides an output and input interface simultaneously between the terminal 10 and the users. In addition to displaying the video outputs to the users, the touch screen also receives user inputs, such as user gesture operations like clicking, sliding and so on, so that the user interface objects respond to these user inputs. The techniques for detecting the user inputs may be resistive, capacitive or any other possible touch detection techniques. Specific examples of the touch screen display units include, but are not limited to, liquid crystal displays or luminescent polymer displays.

The button module 120 also provides an interface for the users to input to the terminal 10, the users can press different buttons to cause the terminal 10 to perform different functions.

Figure 4:
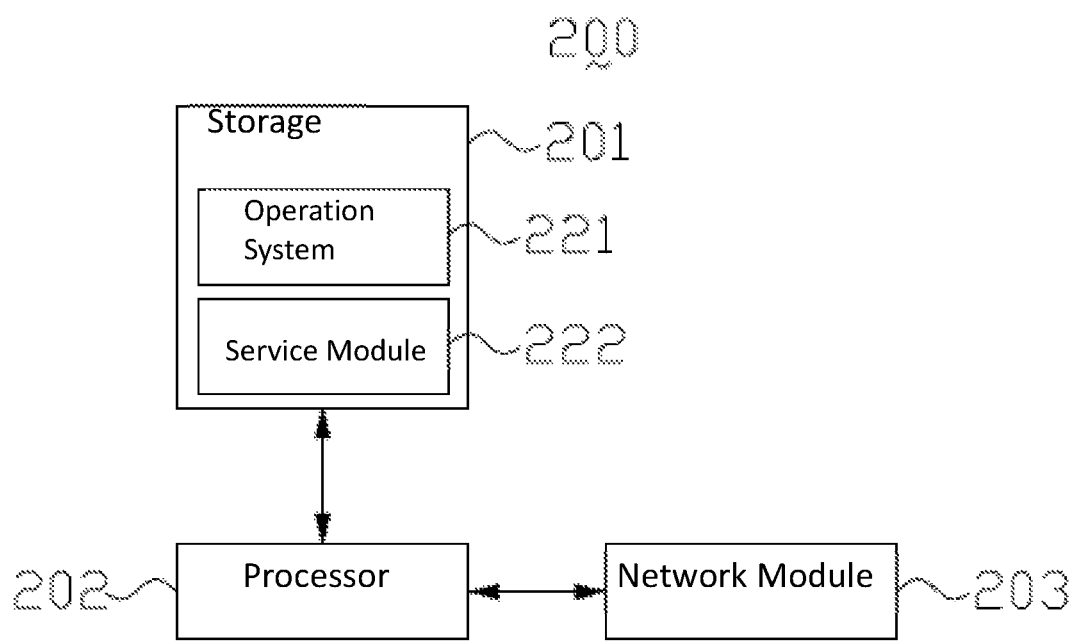
FIG. 4 is a schematic diagram illustrating an example server that may be used in accordance with the present disclosure.

FIG. 4 shows a structure block diagram of a server. As shown in FIG. 4, the server 200 includes: a storage 201, a processor 202, and a network module 203.

It can be understood that the structure shown in FIG. 4 is illustrative only, and the server 200 may also include more or fewer components than those shown in FIG. 4, or may have a configuration different from that shown in FIG. 4. The components shown in FIG. 4 can be implemented by hardware, software or their combinations. In addition, the servers in the embodiments of the present invention can also include a plurality of servers with different specific functions.

The Storage 201 can be used to store software programs and modules, such as program instructions/modules corresponding to the case allocation methods, the case allocation systems, the event allocation methods and the event allocation systems in the embodiments of the present invention, the processor 202 runs software programs and modules stored in the storage 201, so as to perform various functional applications and data processing, that is, to realize the case allocation methods and the case allocation systems in the embodiments of the present invention. The storage 201 may include high-speed random access storages and may also include non-volatile storages, such as one or more magnetic storage devices, flash storages, or other non-volatile solid-state storages. In some embodiments, the storage 201 may further include storages set remotely relative to the processor 202, these remote storages can be connected to the server 200 through networks. Furthermore, the above-mentioned software programs and modules can also include: an operation system 221 and a service module 222. Wherein the operating system 221, for example, can be LINUX, UNIX, WINDOWS, and can include various software components and/or drivers used for system management tasks (such as memory management, storage device control, power management, etc.), and can communicate with various hardware or software components, so as to provide running environments for other software components. The service module 222 runs on the basis of the operating system 221, and monitors requests from the networks through the network services of the operating system 221, completes corresponding data processing according to the requests, and returns the processing results to the terminal. That is to say, the service module 222 is used to provide network services to the terminal.

The network module 203 is used to receive and send network signals. The above-mentioned network signals may include wireless signals or wired signals. In one example, the above-mentioned network signal is a wired network signal. At this time, the network module 203 may include components such as a processor, a random access storage, a converter, a crystal oscillator, and so on.

Figure 5:
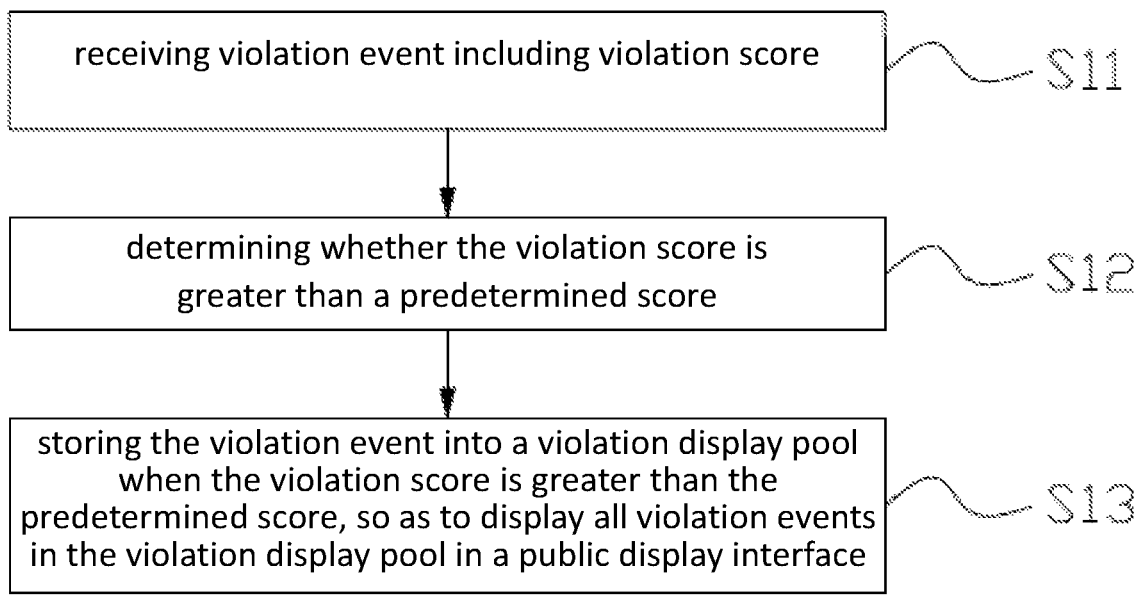
FIG. 5 is a flowchart illustrating an example process of the first embodiment of the present disclosure.

FIG. 5 is a flowchart of the interface display method of the first embodiment of the present invention. The embodiment is an interface display method implemented by a server. As shown in FIG. 5, the interface display method of this embodiment comprises the following steps:

Step S11, receiving a violation case which includes a violation score.

Specifically, in the present embodiment, the violation cases may include, but is not limited to, the cases determined as violations according to preset rules or judged by a review organization with reported videos, reported comments, reported bullet screens or reported tags. For example, the server determines whether received reported videos, reported comments, reported bullet screens and reported tags constitute violations or not according to the preset rules, give a corresponding violation score on a basis of the content attribute of the violation case. The review organization votes on the received reported videos, reported comments, reported bullet screens and reported tags by crowd adjudication, so as to adjudicate whether the reported videos, the reported comments, the reported bullet screens and the reported tags constitute violations or not, and give a corresponding violation score on a basis of the result of the crowd adjudication and the content attribute of the violation case.

Specifically, in one embodiment, the violation case may include, but is not limited to, source information, type information and content information. Specifically, the source information may include, but is not limited to, all source case, system banned case and crowd adjudication banned case, etc. The type information may include, but is not limited to, all type case, video case, comment case, bullet screen case, tag case, personal profile case and contribute case, etc.

Specifically, in one embodiment, the content information of the violation case may include, but is not limited to, profile picture of the violation user, nickname of the violation user, reason of violation and punishment of violation.

Specifically, in one embodiment, when the violation case is a crowd adjudication case, the content information of the violation case further includes crowd adjudication result information and crowd review point information. Specifically, when the violation case is a crowd adjudication case, the content information of the violation case further includes vote result of the violation case made by the review organization and corresponding viewpoint information of the violation case made by the review organization and so on.

Step S12, determining whether the violation score is greater than a preset violation score.

Specifically, in the present embodiment, when the violation score is illustrated with full of 100, the preset violation score may be set at, but is not limited to, 60. But it is not limited to this, in other embodiments, the preset violation score can be set at a score higher or lower than 60.

Step S13, storing the violation case into a violation display pool when the violation score is greater than the preset violation score, so as to display all violation events in the violation display pool in a public display interface.

Specifically, in the present embodiment, when the violation case is a serious violation case, the server stores the violation case into a violation display pool. For example, the violation case is a system banned case, the corresponding violation score will be greater than the preset violation score, as well as, when the violation case is a crowd adjudication case, and the crowd adjudication result of the violation case is banned, the corresponding violation score will be greater than the preset violation score, but it is not limited to this.

Specifically, in one embodiment, the interface display method comprises the step of: storing the violation case into a violation hidden pool in the case of the violation score is less than or equal to the preset violation score, thereby the violation case will not be displayed in the public display interface.

Specifically, in the present embodiment, when the violation case is a slight violation case, the server stores the violation case into a violation hidden pool, the violation events in the violation hidden pool will not be displayed in the public display interface. For example, the violation case is a crowd adjudication case, and the crowd adjudication result of the violation case is only to delete the corresponding violation information, the corresponding violation score of the violation case will be less than or equal to the preset violation score, but it is not limited to this.

Specifically, in one embodiment, every violation case in the violation display pool are arrayed and displayed with a card form in a public display dynamic zone of the public display interface. Specifically, it can, but is not limited to, display a plurality of windows with card form in each line in the public display dynamic zone of the public display interface, and each window with card form display the corresponding content information of one violation case. For example, it can display 3 windows with card form in each line in the public display dynamic zone of the public display interface, but it is not limited to this. In other embodiments, it can display 4 or more windows with card form in each line in the public display dynamic zone of the public display interface. Furthermore, when user touch one card form window, a public display detail interface of the violation case corresponding to the card form window will pop up, so that, the user could learn more violation information, comment information and others of the violation case.

Specifically, in one embodiment, a public display dynamic box is located at the top of the public display dynamic zone of the public display interface. Specifically, it can, but is not limited to, display a virtual button of source information and a virtual button of type information, etc. Wherein, the default of the virtual button of source information is all source case, the default of the virtual button of type information is all type case. When the user terminal receives user's touching on the virtual button of source information or the virtual button of type information, displaying the violation case correspondingly in the public display interface. For example, when user touch the crowd adjudication case in the virtual button of source information, the crowd adjudication violation events will be displayed merely in the public display dynamic zone of the public display interface.

Specifically, in one embodiment, the public display interface also includes a public display box, which is used to display user information and community notice information. Specifically, the user information includes, but is not limited to, users profile picture, users nickname and existing banned record or not, etc. The community notice information includes, but is not limited to, community weekly newspapers, official notices, community hotspots, etc. Specifically, the community notice information could be a window with card form set in the public display box, the default display of the community notice information is the community weekly newspapers, but it is not limited to this.

Furthermore, in the present embodiment, the public display box is also used to display a virtual button of community norms, a virtual button of punishment rules as well as a virtual button of join a review organization.

Specifically, in the present embodiment, when user touch the community notice information, the virtual button of community norms, the virtual button of punishment rules or the virtual button of join a review organization, the public display interface will be updated into a respective information display interface, to display the information correspondingly.

Figure 6:
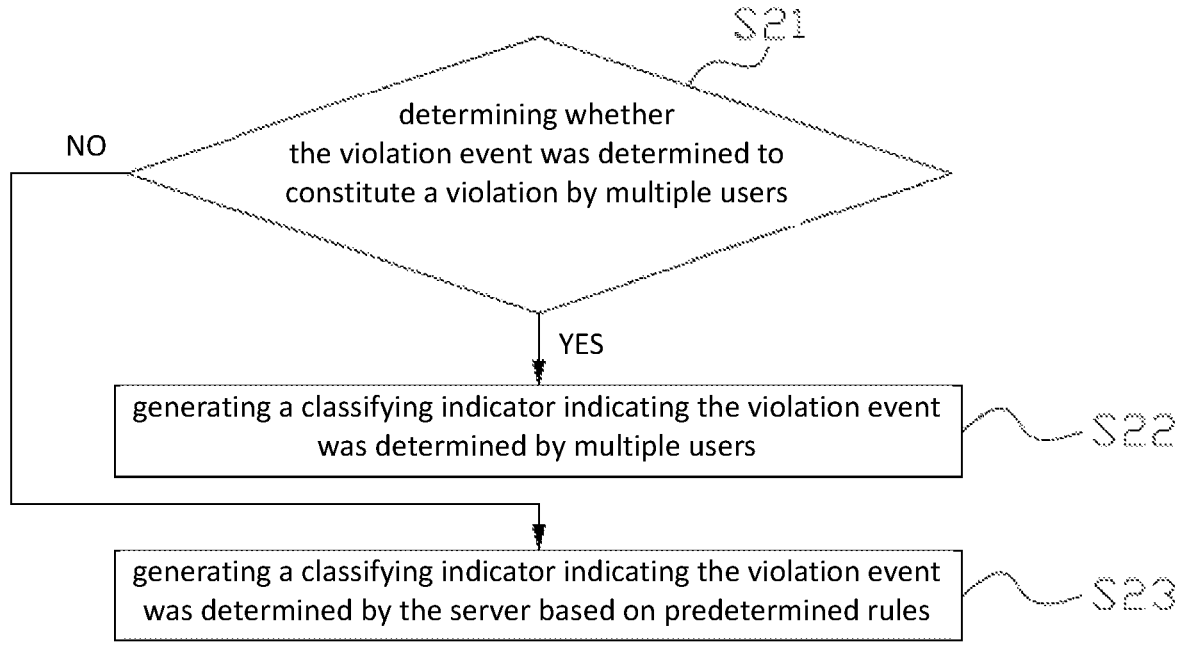
FIG. 6 is a flowchart illustrating an example process of the second embodiment of the present disclosure.

Please refer to FIG. 6, FIG. 6 is a flowchart of the interface display method of the second embodiment of the present invention. As shown in FIG. 5 and FIG. 6, the interface display method is implemented by a server, after the step S13, the interface display method may further comprise, but is not limited to, following steps:

Step S21, determining whether the violation event was determined to constitute a violation by a plurality of users.

Specifically, in the present embodiment, if yes, enter Step S22, generating a first indicator classifying the violation event and indicating that the violation event was determined to constitute a violation by the plurality of users; updating the storing of the violation case into a crowd adjudication display list in the violation display pool. If not, enter Step S23, generating a second indicator classifying the violation event and indicating that the violation event was determined to constitute a violation by the server computing device based on predetermined rules; updating the storing of the violation case into a system banned display list in the violation display pool.

Specifically, in the present embodiment, it can, but is not limited to, classify the violation events in the violation display pool according to the source information of the violation events. For example, storing the violation events from the crowd adjudication of the review organization into a crowd adjudication display list in the violation display pool, storing the violation events which banned by the server according to the preset rules into a system banned display list in the violation display pool, but it is not limited to this. Specifically, the virtual button of source information includes the virtual buttons of all source cases, the system banned cases and the crowd adjudication cases, etc. The virtual buttons of all source cases, the system banned cases and the crowd adjudication cases may located at a pull-down menu of the virtual button of source information.

For example, when user touch the crowd adjudication case in the virtual button of source information, the crowd adjudication violation events will be displayed merely in the public display dynamic zone of the public display interface. When user touch the system banned case in the virtual button of source information, the system banned cases will be displayed merely in the public display dynamic zone of the public display interface. In this way, users can quickly learn the corresponding cases. Furthermore, when user touch the all source cases in the virtual button of source information, all the violation events in the violation display pool will be displayed in the public display dynamic zone of the public display interface.

Figure 7:
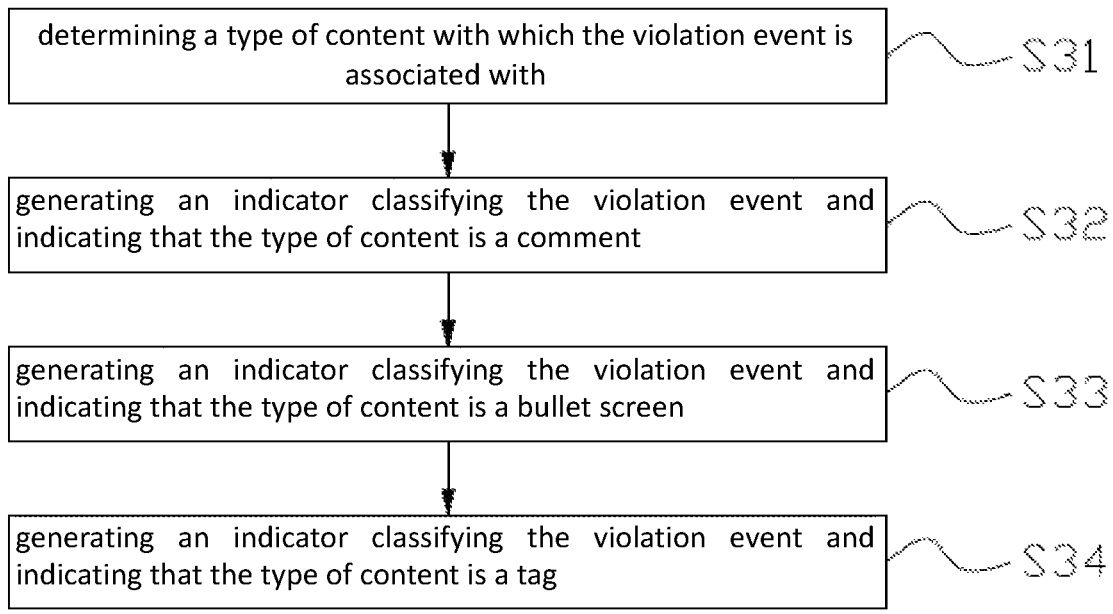
FIG. 7 is a flowchart illustrating an example process of the third embodiment of the present disclosure.

Please refer to FIG. 7, FIG. 7 is a flowchart of the interface display method of the third embodiment of the present invention. As shown in FIG. 5 to FIG. 7, the interface display method is implemented by a server, after the step S13, the interface display method may further comprise, but is not limited to, following steps:

Step S31, determining a type of content with which a violation event is associated based on at least one attribute of content associated with the violation event.

Step S32, generating a third indicator classifying the violation event and indicating that the type of content is determined to be a comment; updating the storing of the violation case into a violation comment display list in the violation display pool, when the type of the violation case is comment violation.

Step S33, generating a fourth indicator classifying the violation event and indicating that the type of content is determined to be a bullet screen; updating the storing of the violation case into a violation bullet screen display list in the violation display pool, when the type of the violation case is bullet screen violation.

Step S34, generating a fifth indicator classifying the violation event and indicating that the type of content is determined to be a tag; updating the storing of the violation case into a violation tag display list in the violation display pool, when the type of the violation case is tag violation.

Specifically, in the present embodiment, it can, but is not limited to, classify the violation events in the violation display pool according to the type of the violation events. For example, updating the storing of the violation case into a violation video display list in the violation display pool, when the type of the violation case is video violation; updating the storing of the violation case into a violation comment display list in the violation display pool, when the type of the violation case is comment violation; updating the storing of the violation case into a violation bullet screen display list in the violation display pool, when the type of the violation case is bullet screen violation; updating the storing of the violation case into a violation tag display list in the violation display pool, when the type of the violation case is tag violation; updating the storing of the violation case into a violation personal profile display list in the violation display pool, when the type of the violation case is personal profile violation; updating the storing of the violation case into a violation contribute display list in the violation display pool, when the type of the violation case is contribute violation; but it is not limited to this. For example, it also can classify the violation case according to the duration of banned.

Specifically, the virtual button of type information includes, but is not limited to, the virtual buttons of all type, video, comment, bullet screen, tag, personal profile and contribute, etc. The virtual buttons of all type, video, comment, bullet screen, tag, personal profile and contribute may located at, but is not limited to, a pull-down menu of the virtual button of type information.

Specifically, when user touch the virtual buttons of comment in the pull-down menu of the virtual button of type information, the violation events in the violation comment display list will be displayed in the public display interface. Meanwhile, user also touch the virtual button of crowd adjudication case in the pull-down menu of virtual button of source information, the crowd adjudication cases by the review organization in the violation comment display list will be displayed merely in the public display interface, but it is not limited to this. For example, user can touch both system banned in the virtual button of source information and one virtual button of type information which includes the virtual buttons of all type, comment, bullet screen, tag, personal profile, contribute and video.

Figure 8:
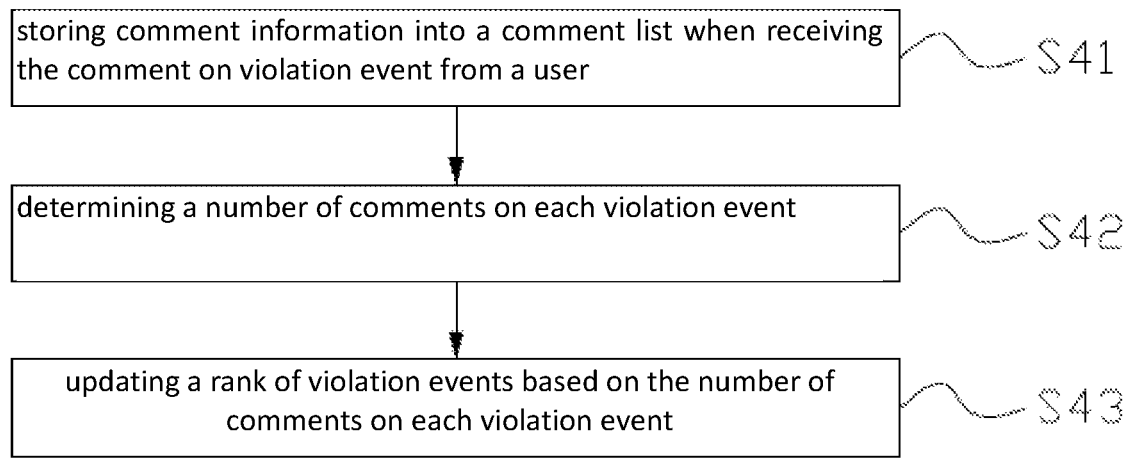
FIG. 8 is a flowchart illustrating an example process of the fourth embodiment of the present disclosure.

Please refer to FIG. 8, FIG. 8 is a flow chart of the interface display method of the fourth embodiment of the present invention. As shown in FIG. 5 to FIG. 8, the interface display method is implemented by a server, after the step S13, the interface display method may further comprise, but is not limited to, following steps:

Step S41, storing a comment information within a command of comment into a comment list, when receive the command of comment corresponding to the violation case.

Specifically, in the present embodiment, when user touch a window with card form corresponding to the violation events in the public display interface, a public display detail interface of the violation events will pop-up. The user with comment qualification can comment in a comment window in the public display detail interface. The content of the user's comment will be displayed in a comment zone in the public display detail interface. The comment information corresponding to the violation case will be store in the comment list.

Step S42, obtaining a comment times of every violation case in the comment list.

Specifically, in the present embodiment, the comment times can equal to, but is not limited to, the sum of the number of comments and the number of replies.

Step S43, updating the order of all violation events in the comment list according to the comment times.

Specifically, in the present embodiment, the violation events in the public display interface can be ranked by the comment times of the violation events, and displayed from high to low in the public display dynamic zone of the public display interface, but it is not limited to this. For example, it also can be ranked by the order of the generated time of the violation events, and so on.

Specifically, in one embodiment, all the comment contents in the comment zone of the public display detail interface corresponding to the violation events can be ranked by the number of replies and likes of the comment contents of the violation events, but it is not limited to this.

Figure 9:
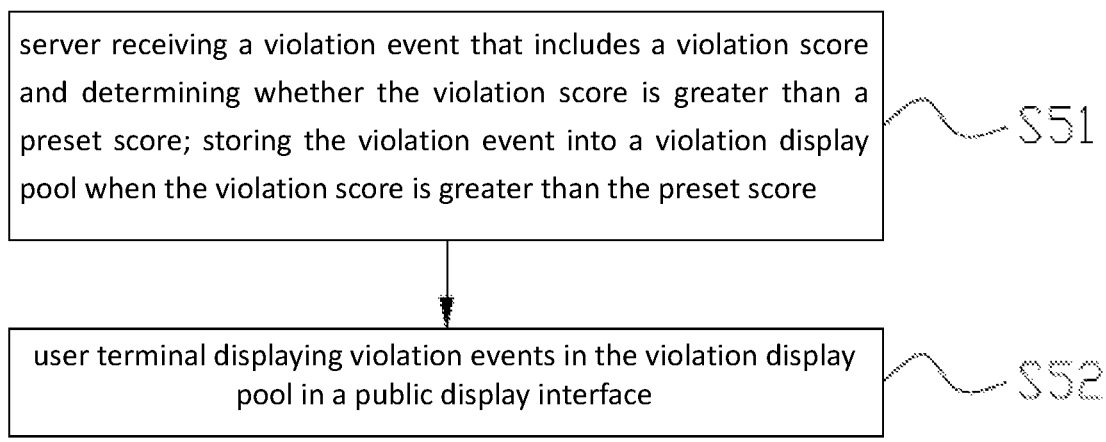
FIG. 9 is a flowchart illustrating an example process of the fifth embodiment of the present disclosure.
Figure 10:
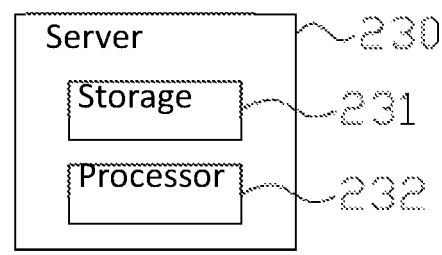
FIG. 10 is a structure block diagram of an example server of the sixth embodiment of the present disclosure.

Please refer to FIG. 9, FIG. 9 is a flowchart of the interface display method of the fifth embodiment of the present invention. The interface display method is implemented by a server. The interface display method may comprise, but is not limited to, following steps:

Step S51, the server receiving a violation case which includes a violation score and determining whether the violation score is greater than a preset violation score; storing the violation case into a violation display pool when the violation score is greater than the preset violation score.

Specifically, in the present embodiment, the violation events may include, but is not limited to, the cases determined violation according to preset rules or judged by a review organization with reported videos, reported comments, reported bullet screens or reported tags. For example, the server determines whether received reported videos, reported comments, reported bullet screens and reported tags constitute violations or not according to the preset rules, give a corresponding violation score on a basis of the content attribute of the violation case. The review organization votes on the received reported videos, reported comments, reported bullet screens and reported tags by crowd adjudication, so as to adjudicate whether the reported videos, the reported comments, the reported bullet screens and the reported tags constitute violations or not, and give a corresponding violation score on a basis of the result of the crowd adjudication and the content attribute of the violation case.

Specifically, in one embodiment, the violation case may include, but is not limited to, source information, type information and content information. Specifically, the source information may include, but is not limited to, all source case, system banned case and crowd adjudication banned case, etc. The type information may include, but is not limited to, all type case, video case, comment case, bullet screen case, tag case, personal profile case and contribute case, etc.

Specifically, in one embodiment, the content information of the violation case may include, but is not limited to, profile picture of the violation user, nickname of the violation user, reason of violation and punishment for violation.

Specifically, in one embodiment, when the violation case is a crowd adjudication case, the content information of the violation case further includes crowd adjudication result information and crowd review point information. Specifically, when the violation case is a crowd adjudication case, the content information of the violation case further includes vote result of the violation case made by the review organization and corresponding viewpoint information of the violation case made by the review organization and so on.

Specifically, in the present embodiment, when the violation case is a serious violation case, the server stores the violation case into a violation display pool. For example, the violation case is a system banned case, the corresponding violation score will be greater than the preset violation score, as well as, when the violation case is a crowd adjudication case, and the crowd adjudication result of the violation case is banned, the corresponding violation score will be greater than the preset violation score, but it is not limited to this.

Specifically, in one embodiment, the server storing the violation case into a violation hidden pool in the case of the violation score is less than or equal to the preset violation score, thereby the violation case in the violation hidden pool will not be sent in the user terminal.

Specifically, in the present embodiment, when the violation case is a slight violation case, the server stores the violation case into a violation hidden pool, the violation events in the violation hidden pool will not be displayed in the public display interface. For example, the violation case is a crowd adjudication case, and the crowd adjudication result of the violation case is only to delete the corresponding violation information, the corresponding violation score of the violation case will be less than or equal to the preset violation score, but it is not limited to this.

Step S52, the user terminal displaying all violation events in the violation display pool in a public display interface.

Specifically, in one embodiment, every violation case in the violation display pool are arrayed and displayed with a card form in a public display dynamic zone of the public display interface. Specifically, it can, but is not limited to, display a plurality of windows with card form in each line in the public display dynamic zone of the public display interface, and each window with card form display the corresponding content information of one violation case. For example, it can display 3 windows with card form in each line in the public display dynamic zone of the public display interface, but it is not limited to this. In other embodiments, it can display 4 or more windows with card form in each line in the public display dynamic zone of the public display interface. Furthermore, when user touch one card form window, a public display detail interface of the violation case corresponding to the card form window will pop up, so that, the user could learn more violation information, comment information and others of the violation case.

Specifically, in one embodiment, a public display dynamic box is located at the top of the public display dynamic zone of the public display interface. Specifically, it can, but is not limited to, display a virtual button of source information and a virtual button of type information, etc. Wherein, the default of the virtual button of source information is all source case, the default of the virtual button of type information is all type case. When the user terminal receives user's touching on the virtual button of source information or the virtual button of type information, displaying the violation case correspondingly in the public display interface. For example, when user touch the crowd adjudication case in the virtual button of source information, the crowd adjudication violation events will be displayed merely in the public display dynamic zone of the public display interface.

Specifically, in one embodiment, the public display interface also includes a public display box, which is used to display user information and community notice information. Specifically, the user information includes, but is not limited to, users profile picture, users nickname and existing banned record or not, etc. The community notice information includes, but is not limited to, community weekly newspapers, official notices, community hotspots, etc. Specifically, the community notice information could be a window with card form set in the public display box, the default display of the community notice information is the community weekly newspapers, but it is not limited to this.

Furthermore, in the present embodiment, the public display box is also used to display a virtual button of community norms, a virtual button of punishment rules as well as a virtual button of join a review organization.

Specifically, in the present embodiment, when user touch the community notice information, the virtual button of community norms, the virtual button of punishment rules or the virtual button of join a review organization, the public display interface will be updated into a respective information display interface, to display the information correspondingly.

Furthermore, in the present embodiment, when received a first choice commend, the user terminal displaying corresponding information in the public display interface according to the first choice commend. Specifically, the first choice commend is a choice commend which generated by, but is not limited to, users' touching on the community notice information, the virtual button of community norms, the virtual button of punishment rules or the virtual button of join a review organization, otherwise, it is a choice commend which generated by users' touching on the virtual button of source information and the virtual button of type information in the public display dynamic box.

Furthermore, in the present embodiment, when received a second choice commend, the user terminal popping up a public display detail interface to display the content information corresponding to the violation case according to the second choice commend. Specifically, the second choice commend is a choice commend which generated by, but is not limited to, users' touching on the card forms windows corresponding to the violation events in the public display dynamic box.

Specifically, in one embodiment, after the step of storing the violation case into a violation display pool, the interface display method further comprises following steps: the server determining whether the violation case is a crowd adjudication case or not according to the source information of the violation case; if yes, updating the storing of the violation case into a crowd adjudication display list in the violation display pool; if not, updating the storing of the violation case into a system banned display list in the violation display pool.

Specifically, in the present embodiment, it can, but is not limited to, classify the violation events in the violation display pool according to the source information of the violation events. For example, storing the violation events from the crowd adjudication of the review organization into a crowd adjudication display list in the violation display pool, storing the violation events which banned by the server according to the preset rules into a system banned display list in the violation display pool, but it is not limited to this. Specifically, the virtual button of source information includes the virtual buttons of all source cases, the system banned cases and the crowd adjudication cases, etc. The virtual buttons of all source cases, the system banned cases and the crowd adjudication cases may located at a pull-down menu of the virtual button of source information. For example, when user touch the crowd adjudication case in the virtual button of source information, the crowd adjudication violation events will be displayed merely in the public display dynamic zone of the public display interface. When user touch the system banned case in the virtual button of source information, the system banned cases will be displayed merely in the public display dynamic zone of the public display interface. In this way, users can quickly learn the corresponding cases. Furthermore, when user touch the all source cases in the virtual button of source information, all the violation events in the violation display pool will be displayed in the public display dynamic zone of the public display interface.

Specifically, in one embodiment, after the step of storing the violation case into a violation display pool, the interface display method further comprises: the server determining the type of the violation case according to the type information of the violation case; updating the storing of the violation case into a violation comment display list in the violation display pool, when the type of the violation case is comment violation; updating the storing of the violation case into a violation bullet screen display list in the violation display pool, when the type of the violation case is bullet screen violation; updating the storing of the violation case into a violation tag display list in the violation display pool, when the type of the violation case is tag violation.

Specifically, in the present embodiment, it can, but is not limited to, classify the violation events in the violation display pool according to the type of the violation events. For example, updating the storing of the violation case into a violation video display list in the violation display pool, when the type of the violation case is video violation; updating the storing of the violation case into a violation comment display list in the violation display pool, when the type of the violation case is comment violation; updating the storing of the violation case into a violation bullet screen display list in the violation display pool, when the type of the violation case is bullet screen violation; updating the storing of the violation case into a violation tag display list in the violation display pool, when the type of the violation case is tag violation; updating the storing of the violation case into a violation personal profile display list in the violation display pool, when the type of the violation case is personal profile violation; updating the storing of the violation case into a violation contribute display list in the violation display pool, when the type of the violation case is contribute violation; but it is not limited to this. For example, it also can classify the violation case according to the duration of banned. Specifically, the virtual button of type information includes, but is not limited to, the virtual buttons of all type, video, comment, bullet screen, tag, personal profile and contribute, etc. The virtual buttons of all type, video, comment, bullet screen, tag, personal profile and contribute may located at, but is not limited to, a pull-down menu of the virtual button of type information. Specifically, when user touch the virtual buttons of comment in the pull-down menu of the virtual button of type information, the violation events in the violation comment display list will be displayed in the public display interface. Meanwhile, user also touch the virtual button of crowd adjudication case in the pull-down menu of virtual button of source information, the crowd adjudication cases by the review organization in the violation comment display list will be displayed merely in the public display interface, but it is not limited to this. For example, use can touch both system banned in the virtual button of source information and one virtual button of type information which includes the virtual buttons of all type, comment, bullet screen, tag, personal profile, contribute and video.

Specifically, in one embodiment, after the step of displaying all violation events in the violation display pool in a public display interface, the interface display method further comprises: the server storing a comment information within a command of comment into a comment list, when receive the command of comment corresponding to the violation case; obtaining a comment times of every violation case in the comment list; so that updating the order of all violation events in the comment list according to the comment times; the user terminal displaying all violation events in the public display interface according the updated comment list.

Specifically, in the present embodiment, the violation events in the public display interface can be ranked by the comment times of the violation events, and displayed from high to low in the public display dynamic zone of the public display interface, but it is not limited to this. For example, it also can be ranked by the order of the generated time of the violation events, and so on.

Specifically, in one embodiment, all the comment contents in the comment zone of the public display detail interface corresponding to the violation events can be ranked by the number of replies and likes of the comment contents of the violation events, but it is not limited to this.

Please refer to FIG. 9, FIG. 9 is a structure block diagram of the server 230 of the sixth embodiment of the present invention. As shown in FIG. 9, the server 230 provided in the present embodiment is used to implement the interface display method. The server 230 provided in the present embodiment comprises a storage 231 and a processor 232. Specifically, the structure of the server 230 may refer to FIG. 3.

Specifically, in the present embodiment, the storage 231 is used to store executable program codes; the processor 232 is used to invoke the executable program codes in the storage. The invoke steps comprise: receiving a violation case which includes a violation score; determining whether the violation score is greater than a preset violation score; storing the violation case into a violation display pool when the violation score is greater than the preset violation score, so as to display all violation events in the violation display pool in a public display interface.

Specifically, after the step of determining whether the violation score is greater than a preset violation score, the server 230 is also used to store the violation case into a violation hidden pool in the case of the violation score is less than or equal to the preset violation score, thereby the violation case will not be displayed in the public display interface.

Specifically, the violation case also includes source information, type information and content information Specifically, the server 230 is also used to determine whether the violation case is a crowd adjudication case or not according to the source information of the violation case.

If yes, update the storing of the violation case into a crowd adjudication display list in the violation display pool. If not, update the storing of the violation case into a system banned display list in the violation display pool.

Specifically, the server 230 is also used to determine the type of the violation case according to the type information of the violation case; update the storing of the violation case into a violation comment display list in the violation display pool, when the type of the violation case is comment violation, update the storing of the violation case into a violation bullet screen display list in the violation display pool, when the type of the violation case is bullet screen violation; update the storing of the violation case into a violation tag display list in the violation display pool, when the type of the violation case is tag violation.

Specifically, the server 230 is also used to store a comment information within a command of comment into a comment list, when receive the command of comment corresponding to the violation case; obtains a comment times of every violation case in the comment list; update the order of all violation events in the comment list according to the comment times.

Specifically, in the present embodiment, the content information of the violation case includes, but is not limited to, profile picture of the violation user, nickname of the violation user, reason of violation and punishment of violation.

Specifically, in the present embodiment, when the violation case is a crowd adjudication case, the content information of the violation case further includes crowd adjudication result information and crowd review point information.

Specifically, in the present embodiment, every violation case in the violation display pool are arrayed and displayed with a card form in a public display dynamic zone of the public display interface.

Specifically, in the present embodiment, the public display interface also includes a public display box which used to display user information and community notice information. Specifically, the public display box is also used to display a virtual button of community norms, a virtual button of punishment rules as well as a virtual button of join a review organization.

Specifically, in the present embodiment, the specific structure of the server 230 may refer to the structure of the server 200 shown in FIG. 3, and it will not be repeated here.

As to the specific processes in which various functional units of the server 230 of the present embodiment carry out their own functions respectively, please refer to the specific content described in the embodiments shown in FIG. 4 and FIG. 7 mentioned above, and it will not be repeated here.

Figure 11:
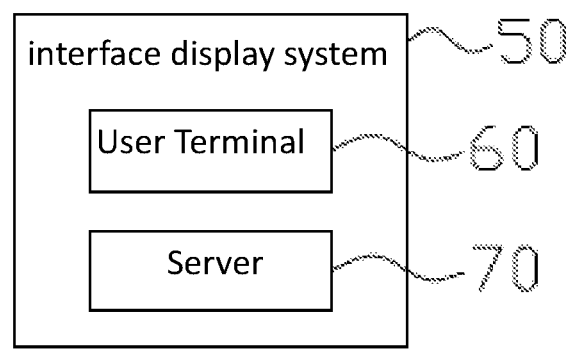
FIG. 11 is a structure block diagram of an example system of the seventh embodiment of the present invention.

Please refer to FIG. 11, FIG. 11 is a structure block diagram of the interface display system 50 of the seventh embodiment of the present invention. As shown in FIG. 11, the interface display system 50 provided in the present embodiment is used to implement the interface display method. The interface display system 50 provided in the present embodiment comprises a user terminal 60 and a server 70.

Specifically, in the present embodiment, the server 70 is used to receive a violation case which includes a violation score; determine whether the violation score is greater than a preset violation score; store the violation case into a violation display pool when the violation score is greater than the preset violation score, so as to display all violation events in the violation display pool in a public display interface.

Specifically, the server 70 is also used to store the violation case into a violation hidden pool in the case of the violation score is less than or equal to the preset violation score, thereby the violation events in the violation hidden pool will not be send to the user terminal 60.

Specifically, the violation case also includes source information, type information and content information.

Specifically, in the present embodiment, the content information of the violation case includes, but is not limited to, profile picture of the violation user, nickname of the violation user, reason of violation and punishment of violation.

Specifically, in the present embodiment, when the violation case is a crowd adjudication case, the content information of the violation case further includes crowd adjudication result information and crowd review point information.

Specifically, in the present embodiment, every violation case in the violation display pool are arrayed and displayed with a card form in a public display dynamic zone of the public display interface on the user terminal 60.

Specifically, in the present embodiment, the public display interface also includes a public display box which used to display user information and community notice information. Specifically, the public display box is also used to display a virtual button of community norms, a virtual button of punishment rules as well as a virtual button of join a review organization.

Specifically, in the present embodiment, when received a first choice commend, the user terminal 60 displays corresponding information in the public display interface according to the first choice commend.

Specifically, in the present embodiment, when received a second choice commend, the user terminal 60 pops up a public display detail interface to display the content information corresponding to the violation case according to the second choice commend.

As to the specific processes in which various functional units of the interface display system 50 of the present embodiment carry out their own functions respectively, please refer to the specific content described in the embodiments shown in FIG. 8 mentioned above, and it will not be repeated here.

The above-mentioned server may include, but is not limited to, one or more second processors and one or more second storages. The second storage can be used to store software programs and modules, and the second processor performs various functional applications and data processing by running the software programs and the modules stored in the second storage.

The interface display method, the server and the interface display system provided by the present invention, classify the received violation events and display in the public display interface, so as to effectively increase users' awareness of violation behaviors, to form a virtuous online community ecology of self-purification, autonomy and self-kindness, to improve video network environment, users' enthusiasm for participation and user experience.

In addition, the embodiments of the present invention also provide a computer-readable storage medium in which computer-executable instructions are stored, the computer-readable storage medium can be, for example, non-volatile storages such as optical disks, hard disks, or Flash memories. The above-mentioned computer executable instructions are used to allow a computer or similar computing devices to perform various operations in the case allocation method and the event allocation method described above.

It should be noted that, the various embodiments in this specification are described in a progressive manner, each of which focuses on the differences from other embodiments, and the same and similar parts among the various embodiments can be referred to each other. For terminal embodiments, because they are basically similar to the method embodiments, their descriptions are relatively simple, and the relevant points can just be referred to parts of the descriptions of the method embodiments.

What is claimed is:

1. A computer-implemented method of presenting violation events in a network community comprising a server computing device and a plurality of client computing devices, comprising:
    receiving, by the server computing device, a file containing information indicative of a violation by a user in the network community and a corresponding violation score, wherein the violation comprises a violation of at least one of a set of predefined rules;
    determining, by the server computing device, whether the violation score is greater than a predetermined threshold;
    storing, by the server computing device, the file into a violation display pool based on determining that the corresponding violation score is greater than the predetermined threshold, wherein the violation display pool comprises a first plurality of violation events, and wherein each violation event comprises information indicative of how the violation event has been determined to constitute a violation, at least one attribute of content associated with the violation event, and information relating to the violation event,
        wherein the storing the file into a violation display pool further comprises:
        determining a type of content with which each violation event among the first plurality of violation events is associated based on the at least one attribute of content associated with each violation event, wherein the type of content with which each violation event is associated comprises video, comment, bullet screen, and tag,
        classifying the first plurality of violation events based on the determined type of content with which each violation event is associated, and
        storing the first plurality of violation events in different display lists of the violation display pool based on different classifications of the first plurality of violation events;
    sending, by the server computing device, the first plurality of violation events to the plurality of client computing devices, wherein the first plurality of violation events are viewable on a display device by each of the plurality of client computing devices; and
    storing, by the server computing device, the file in a violation hidden pool based on determining that the corresponding violation score is not greater than a predetermined threshold, wherein the violation hidden pool comprises a second plurality of violation events that are inaccessible by the plurality of client computing devices.

2. The computer-implemented method of claim 1, further comprising:
    determining, by the server computing device, whether a violation event among the first plurality of violation events was determined to constitute a violation by a plurality of users in the network community;
    in response to a determination that the violation event was determined to constitute a violation by the plurality of users, generating, by the server computing device, a first indicator classifying the violation event, the first indicator indicating that the violation event was determined to constitute a violation by the plurality of users; and
    in response to a determination that the violation event was not determined to constitute a violation by the plurality of user, generating, by the server computing device, a second indicator classifying the violation event, the second indicator indicating that the violation event was determined to constitute a violation by the server computing device based on predetermined rules.

3. The computer-implemented method of claim 1, further comprising:
    generating, by the server computing device, a third indicator classifying the violation event, the third indicator indicating that the type of content is determined to be a comment;
    generating, by the server computing device, a fourth indicator classifying the violation event, the indicator indicating that the type of content is determined to be a bullet screen; and
    generating, by the storage computing device, a fifth indicator classifying the violation event, the indicator indicating that the type of content is determined to be a tag.

4. The computer-implemented method of claim 1, wherein the information relating to the violation event comprises profile information of the user, information indicative of at least one reason for the violation, and at least one penalty for the violation.

5. The computer-implemented method of claim 2, wherein the information relating to the violation event further comprises information indicative of a crowd adjudication result and information indicative of a crowd discussion opinion when the violation event was determined to constitute a violation by the plurality of users.

6. The computer-implemented method of claim 1, further comprising:
    receiving, by the server computing device, information indicative of a comment on a violation event among the first plurality of violation events from one of the plurality of client computing devices;
    storing, by the server computing device, the information indicative of the comment on the violation event into a comment list;
    determining, by the server computing device, a number of comments on each of the first plurality of violation events; and
    ranking, by the server computing device, the plurality of first violation events based on the number of comments on each violation event.

7. The computer-implemented method of claim 1, wherein the first plurality of violation events are presented in an array of cards in a dynamic area of an interface on each of the plurality of client computing devices.

8. The computer-implemented method of claim 7, wherein the dynamic area of the interface further comprises a plurality of first interface elements by which a user selects to display different classifications of violation events.

9. The computer-implemented method of claim 7, further comprising:
    in response to a selection of a card among the array of cards, displaying, by a client computing device among the plurality of client computing devices, detailed information associated with a corresponding violation event comprising comments on the corresponding violation event.

10. The computer-implemented method of claim 7, wherein the interface further comprises a second area for displaying user information and community notifications.

11. The computer-implemented method of claim 10, wherein the second area of the interface further comprises a plurality of second interface elements by which a user selects to display community guidelines or submit a request for a review qualification.

12. A computing system of presenting violation events in a network community comprising:
at least a processor; and
at least a memory communicatively coupled to the at least a processor to configure the at least a processor to:
receive a file containing information indicative of a violation by a user in the network community and a corresponding violation score, wherein the violation comprises a violation of at least one of a set of predefined rules;
determine whether the violation score is greater than a predetermined threshold;
store the file into a violation display pool based on determining that the corresponding violation score is greater than the predetermined threshold, wherein the violation display pool comprises a first plurality of violation events, and wherein each violation event comprises information indicative of how the violation event has been determined to constitute a violation, at least one attribute of content associated with the violation event, and information relating to the violation event, wherein the at least a memory further configuring the at least a processor to:
determine a type of content with which each violation event among the first plurality of violation events is associated based on the at least one attribute of content associated with each violation event, wherein the type of content with which each violation event is associated comprises video, comment, bullet screen, and tag;
classify the first plurality of violation events based on the determined type of content with which each violation event is associated, and
store the first plurality of violation events in different display lists of the violation display pool based on different classifications of the first plurality of violation events;
send the first plurality of violation events to the plurality of client computing devices, wherein the first plurality of violation events are viewable on a display device by each of the plurality of client computing devices; and
store the file in a violation hidden pool based on determining that the corresponding violation score is not greater than a predetermined threshold, wherein the violation hidden pool comprises a second plurality of violation events that are inaccessible by the plurality of client computing devices.

13. The computing system of claim 12, the at least a memory further configuring the at least a processor to:
determine whether a violation event among the first plurality of violation events was determined to constitute a violation by a plurality of users in the network community;
in response to a determination that the violation event was determined to constitute a violation by the plurality of users, generate a first indicator classifying the violation event, the first indicator indicating that the violation event was determined to constitute a violation by the plurality of users; and
in response to a determination that the violation event was not determined to constitute a violation by the plurality of user, generate a second indicator classifying the violation event, the second indicator indicating that the violation event was determined to constitute a violation by the server computing device based on predetermined rules.

14. The computing system of claim 12, the at least a memory further configuring the at least a processor to:
generate a third indicator classifying the violation event, the third indicator indicating that the type of content is determined to be a comment;
generate a fourth indicator classifying the violation event, the indicator indicating that the type of content is determined to be a bullet screen; and
generate a fifth indicator classifying the violation event, the indicator indicating that the type of content is determined to be a tag.

15. The computing system of claim 12, wherein the information relating to the violation event comprises profile information of the user, information indicative of at least one reason for the violation, and at least one penalty for the violation.

16. The computing system of claim 13, wherein the information relating to the violation event further comprises information indicative of a crowd adjudication result and information indicative of a crowd discussion opinion when the violation event was determined to constitute a violation by the plurality of users.

17. The computing system of claim 12, the at least a memory further configuring the at least a processor to:
receive information indicative of a comment on a violation event among the first plurality of violation events from one of the plurality of client computing devices;
store the information indicative of the comment on the violation event into a comment list;
determine a number of comments on each of the first plurality of violation events; and
rank the plurality of first violation events based on the number of comments on each violation event.

18. The computing system of claim 12, wherein the first plurality of violation events are presented in an array of cards in a dynamic area of an interface on each of the plurality of client computing devices, the dynamic area of the interface comprising a plurality of first interface elements by which a user selects to display different classifications of violation events.

19. The computing system of claim 18, wherein the interface further comprises a second area for displaying user information and community notifications, the second area of the interface comprising a plurality of second interface elements by which a user selects to display community guidelines or submit a request for a review qualification.

20. A non-transitory computer-readable storage medium bearing computer-readable instructions that upon execution on a computing device cause the computing device at least to:
receive a file containing information indicative of a violation by a user in the network community and a corresponding violation score, wherein the violation comprises a violation of at least one of a set of predefined rules;
determine whether the violation score is greater than a predetermined threshold;
store the file into a violation display pool based on determining that the corresponding violation score is greater than the predetermined threshold, wherein the violation display pool comprises a first plurality of violation events, and wherein each violation event comprises information indicative of how the violation event has been determined to constitute a violation, at least one attribute of content associated with the violation event, and information relating to the violation event, wherein the instructions upon execution on the computing device further cause the computing device to:
- determine a type of content with which each violation event among the first plurality of violation events is associated based on the at least one attribute of content associated with each violation event, wherein the type of content with which each violation event is associated comprises video, comment, bullet screen, and tag,
- classify the first plurality of violation events based on the determined type of content with which each violation event is associated, and
- store the first plurality of violation events in different display lists of the violation display pool based on different classifications of the first plurality of violation events;

send the first plurality of violation events to the plurality of client computing devices, wherein the first plurality of violation events are viewable on a display device by each of the plurality of client computing devices; and store the file in a violation hidden pool based on determining that the corresponding violation score is not greater than a predetermined threshold, wherein the violation hidden pool comprises a second plurality of violation events that are inaccessible by the plurality of client computing devices.

* * * * *